UNITED STATES PATENT OFFICE.

ANDRÉ ROOSEVELT, OF NEW YORK, N. Y., ASSIGNOR TO GLASS FOUNDERS CORPORATION, OF NEW YORK, N. Y., A CORPORATION OF NEW YORK.

NON-SCATTERABLE GLASS AND THE PROCESS OF MAKING IT.

1,210,987.     Specification of Letters Patent.     Patented Jan. 2, 1917.

No Drawing.     Application filed June 3, 1915. Serial No. 31,807.

*To all whom it may concern:*

Be it known that I, ANDRÉ ROOSEVELT, a citizen of the United States, and a resident of the borough of Richmond, city and State of New York, have invented certain new and useful Improvements in Non-Scatterable Glass and the Processes of Making It, of which the following is a specification.

My invention relates to a composite glass sheet composed of ordinary glass combined with a transparent cellulose material in such a way that the final product, while transparent, will be reinforced and strengthened as compared with ordinary glass and will not shatter when broken as by a blow, so as to cause pieces thereof to scatter. Such a glass has obviously many valuable applications among which its use as a windshield for automobiles may be mentioned.

The object of my invention is to provide a glass of the kind described in which the various laminæ are adherent to each other to a high degree, in which the transparency of the ordinary glass, if impaired at all, is affected only slightly, and in which the characteristics of strength and non-scatterability are present to a maximum degree.

In the operation of the process of my invention a sheet of ordinary glass is first cleaned thoroughly, the clean surface is then coated with a solution of gelatin or other suitable transparent gelatinous substance and thereupon a solution of cellulose material is applied at least one of the solvents employed having a solvent action upon both the gelatin and the cellulose material. The glass sheet may be cleaned with the aid of any suitable scouring material such as a scouring soap and the operation may be performed either by hand or by a machine. It is important, if the best results are desired, that dirt of any kind and especially that of a greasy nature be wholly removed and that a polish be given to the glass as by rubbing with a clean, dry cloth. A gelatin solution is now prepared in any suitable way, as for example by dissolving pieces of sheet gelatin in formic acid (sp. gr. 1.20), the best proportions known to me being 7 parts gelatin to 93 parts formic acid, and then filtering through a filter paper. Instead of formic acid any other solvent of gelatin may be used which also has solvent action upon the cellulose material subsequently to be used. An ordinary aqueous solution of gelatin may be first employed and the formic acid or its equivalent may be applied to or added to the subsequent cellulose solution but such practice has not been found as successful, (owing possibly to the presence or action of water) as the employment of a formic acid solution of gelatin. The gelatin solution may be of practically any strength. A solution containing 2% gelatin is preferable over a strong solution, say, a 15% solution, because it produces a desirably thin film on the plate. The gelatin solution may be spread upon the clean glass in any suitable manner. For example, it may be poured upon and flowed uniformly over the glass, the excess being poured off one corner of the plate and then set up on edge to drip. While so arranged the formic acid or other solvent will evaporate leaving a thin film of gelatin strongly adhering to the glass. When partially dry, that is, dry enough so that the film may be touched by the finger without adhering, which condition obtains after a period of time varying from less than a half hour to several hours, depending on the moisture of the air, the glass is ready for the next coating of cellulose material. The cellulose material may be prepared by dissolving 17 parts of celluloid in small pieces in a suitable solvent, such as acetone, in which case 44.25 parts of acetone may be used, and adding to it, mixing thoroughly meanwhile, a solution of camphor in a suitable solvent for instance such as may be made by employing 3.35 parts of camphor and 35.4 parts of denatured alcohol. The mixing of the solutions should be continued, their temperature being preferably maintained at not exceeding 50° C., until a homogeneous mass has been formed; the mass is then filtered, as by being forced through a felt and silk filtering material by air pressure, and a viscous product is thus obtained.

While the above is the preferred method of preparing the cellulose solution, it is capable of being made by any other process which will yield a clear, transparent film, any suitable solvent being employed, since this solvent acts merely as a vehicle for transferring the cellulose material to the coated glass. The addition of the camphor solution is not necessary but with certain celluloids this addition has been found to be advantageous. Instead of celluloid, nitro-cellulose, with the addition of camphor, or acetate of cellulose or any other equivalent cellulose material may be used. The formic acid may be incorporated, as stated above, with the cellulose material.

The viscous solution of cellulose material, prepared in any of the above indicated ways, is now placed upon the gelatin film hereinbefore described, and spread there-over in any suitable manner; the coating of cellulose material, and the first coating of gelatin also, may be applied by hand or by suitable mechanism. The amount of material used is preferably such as will completely cover the plate when in a horizontal position and will overflow if more is added. The plate is now allowed to stand on a leveled table in an atmosphere of a solvent and out of contact with moisture. This may be accomplished by surrounding the plate by a glass topped frame, the spaces between the frame sides and the cellulose-covered plate being occupied by troughs containing acetone and dry, fused calcium chlorid. When thus allowed to stand for about four hours the viscous cellulose material will flow to produce a level surface of clear cellulose solution. The frame may then be removed to allow the cellulose solvents to evaporate. In a short time after the removal of the frame, the cellulose material may first be opalescent, but this condition gradually disappears as the solvents evaporate, leaving the film clear and transparent. After standing exposed to the air, for about twelve hours, the composite plate is removed to a suitable drying chamber and kept there for about three days, being subjected meanwhile to a bath of air at about 20 to 40 C. The solvents are thus removed and the plate is now in a finished condition and may be used either alone or combined in any suitable manner with a protective material such as a second glass plate. For example, if two similar plates, prepared as described, are desired to be combined, the cellulose surfaces of the two plates may be placed in contact and the edges of the plates cemented together in any well-known and suitable fashion. If it is desired to produce a glass of a particular color a suitable dye-stuff may be added to the celluloid solution or to the gelatin solution for this purpose.

The product thus formed is characterized by great strength and resistance to shattering blows and by the non-scattering of the fragments in case of the sheet being broken. These characteristics are especially pronounced because of the close adherence between the gelatin and cellulose films caused by the employment of a solvent such as formic acid in one or the other of the solutions applied, which is a solvent for both the gelatin and the cellulose material. The gelatin film when dried to the extent indicated, that is, to the point at which the finger when touched against the film will not sensibly adhere to it, contains sufficient traces of formic acid, which traces have a solvent action upon the celluloid film subsequently applied, whereby an intermingling of the two solutions in the region of their contact with each other is produced which has the result of so uniting the two layers by an intermingling and interlocking, as it were, of their molecules that the joining is not merely a surface adherence and that a great stress is required to tear them apart.

I claim:

1. The process of making non-scatterable glass which comprises applying to a sheet of glass successively a solution of gelatin and a solution of cellulose material, at least one of said solutions containing a solvent which has a solvent action upon both the gelatin and the cellulose material.

2. The process of making non-scatterable glass which comprises applying to a sheet of glass a transparent gelatinous solution, allowing said solution to partially dry and then applying thereto a solution of cellulose material, at least one of said solutions containing formic acid.

3. The process of making non-scatterable glass which comprises applying to a sheet of glass a solution of gelatin dissolved in formic acid, allowing said solution to partially dry and then applying thereto a solution of cellulose material.

4. The process of making non-scatterable glass which comprises applying to a sheet of glass a solution of gelatin dissolved in formic acid, allowing said solution to partially dry and then applying thereto a solution of celluloid dissolved in acetone.

5. The process of making non-scatterable glass which comprises applying to a sheet of glass a gelatin coating and applying to said gelatin coating a coating of cellulose material, there being present in the region of contact of the two coatings a solvent for both.

6. The process of making non-scatterable glass which comprises applying to a sheet of glass a gelatin coating and applying to said gelatin coating a coating of cellulose material, formic acid being present in the region of contact of the two coatings.

7. A non-scatterable glass comprising a sheet of glass, a film of gelatin thereon and a film of cellulose material on said gelatin film, the two films being interlocked in the region of their contact by a solvent common to both films.

8. A non-scatterable glass comprising a sheet of glass, a film of gelatin thereon, a film of cellulose material on said gelatin film, the two films being interlocked by having been dissolved into each other at the region of contact by a common solvent, and a protective material covering said film of cellulose material.

In testimony whereof I have hereunto set my hand in the presence of two subscribing witnesses.

ANDRÉ ROOSEVELT.

Witnesses:
FRITZ ZIEGLER, Jr.,
JOHN A. FERGUSON.

DISCLAIMER.

1,210,987.—*André Roosevelt*, New York, N. Y. NON-SCATTERABLE GLASS AND THE PROCESS OF MAKING IT. Patent dated January 2, 1917. Disclaimer filed December 19, 1918, by the assignee, *Glass Founders Corporation*.

Enters its disclaimer to those portions of the specification, and to that portion of the claim which is in the following words, to wit:

Page 1, lines 34-36: "at least one of the solvents employed having a solvent action upon both the gelatin and the cellulose material."

Same page, lines 51-62: "Instead of formic acid any other solvent of gelatin may be used which also has solvent action upon the cellulose material subsequently to be used. An ordinary aqueous solution of gelatin may be first employed and the formic acid or its equivalent may be applied to or added to the subsequent cellulose solution but such practice has not been found as successful (owing possibly to the presence or action of water) as the employment of a formic acid solution of gelatin."

Same page, line 73: "or other solvent."

Page 2, lines 6-8: "The formic acid may be incorporated, as stated above, with the cellulose material."

Same page, lines 64-81: "a solvent such as formic acid in one or the other of the solutions applied, which is a solvent for both the gelatin and the cellulose material. The gelatin film when dried to the extent indicated, that is, to the point at which the finger when touched against the film will not sensibly adhere to it, contains sufficient traces of formic acid, which traces have a solvent action upon the celluloid film subsequently applied, whereby an intermingling of the two solutions in the region of their contact with each other is produced which has the result of so uniting the two layers by an intermingling and interlocking, as it were, of their molecules that the joining is not merely a surface adherence and that a great stress is required to tear them apart."

"1. The process of making non-scatterable glass which comprises applying to a sheet of glass successively a solution of gelatin and a solution of cellulose material, at least one of said solutions containing a solvent which has a solvent action upon both the gelatin and the cellulose material.

"2. The process of making non-scatterable glass which comprises applying to a sheet of glass a transparent gelatinous solution, allowing said solution to partially dry and then applying thereto a solution of cellulose material, at least one of said solutions containing formic acid.

"5. The process of making non-scatterable glass which comprises applying to a sheet of glass a gelatin coating and applying to said gelatin coating a coating of cellulose material, there being present in the region of contact of the two coatings a solvent for both.

"6. The process of making non-scatterable glass which comprises applying to a sheet of glass a gelatin coating and applying to said gelatin coating a coating of cellulose material, formic acid being present in the region of contact of the two coatings.

"7. A non-scatterable glass comprising a sheet of glass, a film of gelatin thereon and a film of cellulose material on said gelatin film, the two films being interlocked in the region of their contact by a solvent common to both films.

"8. A non-scatterable glass comprising a sheet of glass, a film of gelatin thereon, a film of cellulose material on said gelatin film, the two films being interlocked by having been dissolved into each other at the region of contact by a common solvent, and a protective material covering said film of cellulose material."

[*Official Gazette, December 17, 1918.*]